(12) United States Patent
Scholte-Wassink

(10) Patent No.: US 8,177,505 B2
(45) Date of Patent: May 15, 2012

(54) METHOD FOR MEASURING A ROTATIONAL POSITION OF A ROTOR BLADE OF A WIND TURBINE AND MEASURING DEVICE

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/765,560

(22) Filed: Apr. 22, 2010

(65) Prior Publication Data

US 2011/0135469 A1    Jun. 9, 2011

(51) Int. Cl.
*F03D 7/02* (2006.01)
(52) U.S. Cl. .............................. 416/1; 416/61; 416/146 R
(58) Field of Classification Search .................. 290/44, 290/55; 415/35, 118; 416/1, 61, 146 R; 702/150, 151
See application file for complete search history.

(56) References Cited

U.S. PATENT DOCUMENTS

| | | | |
|---|---|---|---|
| 7,092,786 B2* | 8/2006 | Yasugi et al. | 700/174 |
| 2008/0292467 A1* | 11/2008 | Borgen | 416/244 R |
| 2010/0014969 A1* | 1/2010 | Wilson et al. | 416/1 |

FOREIGN PATENT DOCUMENTS

GB    2448940 A  * 11/2008

* cited by examiner

*Primary Examiner* — Edward Look
*Assistant Examiner* — Sean J Younger
(74) *Attorney, Agent, or Firm* — Global Patent Operation; Douglas D. Zhang (57) ABSTRACT

The present disclosure is related to a method and a measuring device adapted for determining a rotational position of at least one rotor blade of a wind turbine. The method includes a step of measuring a gravity induced blade moment of the at least one rotor blade. Then, an actual rotational position of the rotor blade is determined from the measured gravity induced blade moment.

19 Claims, 10 Drawing Sheets

FIG. 10

METHOD FOR MEASURING A ROTATIONAL POSITION OF A ROTOR BLADE OF A WIND TURBINE AND MEASURING DEVICE

BACKGROUND OF THE INVENTION

The present disclosure generally relates to a measurement system adapted for measuring at least one wind turbine operational parameter. In particular, the present disclosure relates to a measurement system adapted for measuring an operational parameter of at least one rotor blade of the wind turbine. Furthermore, the present disclosure relates to a method for measuring a rotational position of said rotor blade.

Wind turbines have been gaining increasing importance as environmentally safe and reliable energy sources. Wind turbines typically have long maintenance intervals, where in many cases maintenance is focused on a repair of at least one rotor blade of the wind turbine. Rotor blades of wind turbines are sophisticated components adapted for converting incoming wind energy into rotational mechanical energy. The at least one rotor blade is installed at a hub of the rotor of the wind turbine. A rotation of the hub of the wind turbine is transferred to a main rotor shaft driving an electrical generator, typically via a mechanical gearbox.

Typically, a rotor blade of a wind turbine includes a plurality of mechanical and electrical components (e.g., bending moments and wind velocities are measured along the length of a rotor blade by means of different sensors). Furthermore, the environment of the wind turbine may interact with the at least one rotor blade (e.g., lightening strikes, bird impact and other environmental influences) and possibly damage the rotor blade of a wind turbine. Electrical components installed within a rotor blade of a wind turbine may also exhibit failures.

Thus, in some cases, a rotor blade of a wind turbine may be exchanged for maintenance and repair. The sensor components, electrical components including the pitch drive and electronic devices installed at a specific rotor blade usually are assigned individual identifiers or addresses. Thus, these components can be individually identified for sensing and controlling purposes.

In some cases, especially if a number of rotor blades of a wind turbine are exchanged, an individual position of a rotor blade or an order of a number of individual rotor blades may be changed during maintenance and repair work. Thus, it is possible that an individual rotor blade may be installed at a position of the hub of the rotor of the wind turbine which is different from its original position. Accordingly, it would be advantageous to provide independent monitoring of the rotational position and of a blade order of individual rotor blades of a wind turbine.

BRIEF DESCRIPTION

In view of the above, a method for determining a rotational position of at least one rotor blade of a wind turbine is disclosed, the method including the steps of measuring a gravity induced blade moment of at least one rotor blade and determining an actual rotational position of the rotor blade from the measured gravity induced blade moment.

According to another aspect, a measurement device adapted for measuring a rotational position of at least one rotor blade of a wind turbine is disclosed as including a moment detector adapted for measuring a gravity induced blade of the at least one rotor blade and a determination unit adapted for determining an actual rotational position of the rotor blade from the measured gravity induced blade moment.

According to yet another aspect, a wind turbine is disclosed as including a rotor having at least one rotor blade, a pitch angle adjustment unit adapted for adjusting a pitch angle of the at least one rotor blade, and a rotational position measurement device. The measurement device further includes a moment detector adapted for measuring a gravity induced blade moment at the at least one rotor blade and a determination unit adapted for determining an actual rotational position of the at least one rotor blade from the measured gravity induced blade moment.

Further exemplary embodiments are disclosed in accordance with the dependent claims, the description and the accompanying drawings.

BRIEF DESCRIPTION OF THE DRAWINGS

A full and enabling disclosure, including the best mode thereof to one of ordinary skill in the art, is set forth more particularly in the remainder of the specification, including reference to the accompanying figures wherein.

DETAILED DESCRIPTION

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure include such modifications and variations.

A number of embodiments will be explained below. In this case, identical structural features are identified by identical reference symbols in the drawings. The structures shown in the drawings are not depicted true to scale, but rather serve only for the better understanding of the embodiments.

Figure 1:
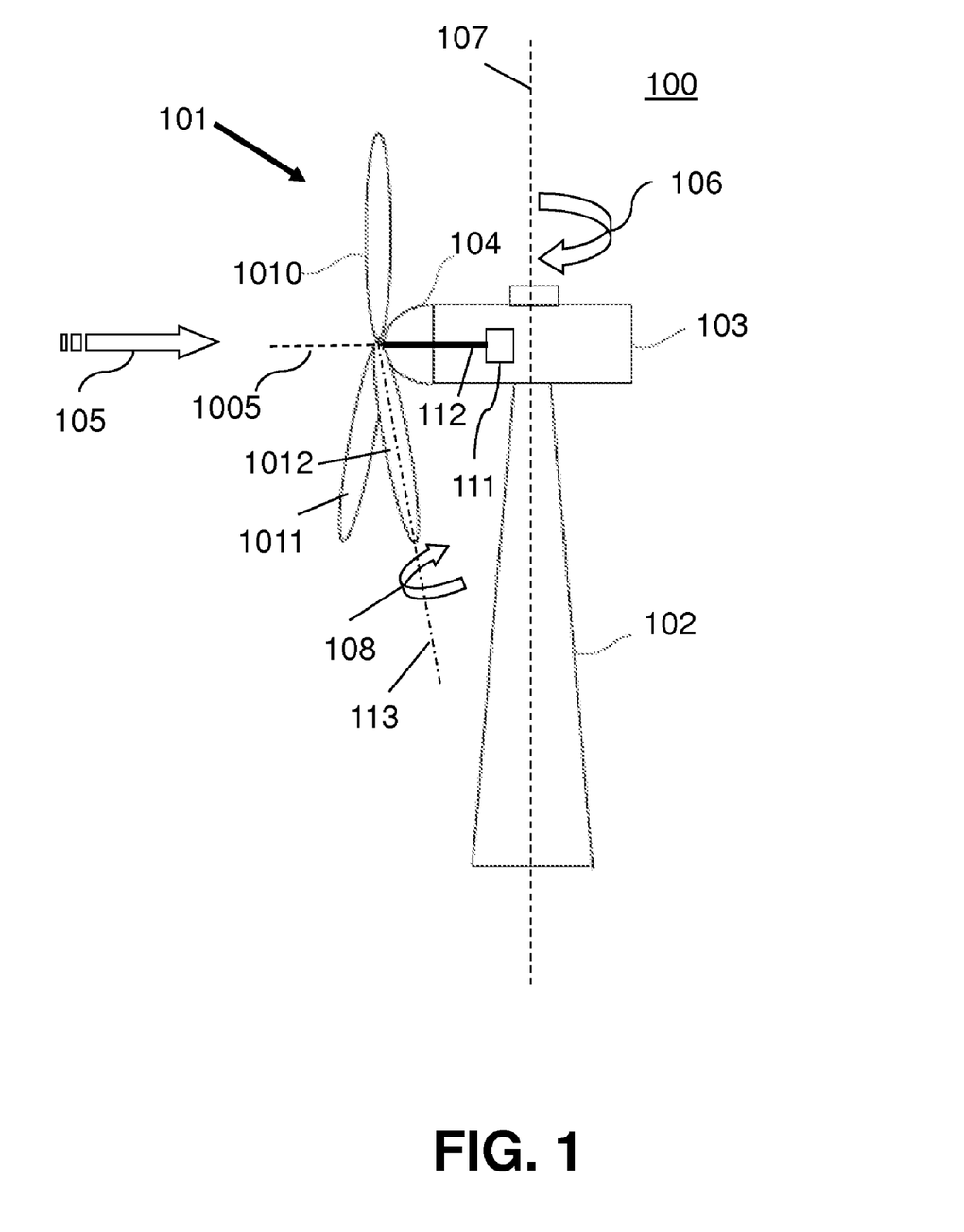
FIG. 1 shows a side view of a wind turbine including a rotor having three rotor blades.

FIG. 1 is a side view of a wind turbine 100 according to a typical embodiment. The wind turbine 100 includes a tower 102 and a machine nacelle 103 which is rotatably arranged atop the tower 102. The machine nacelle 103 may be rotated about a typically vertical tower axis 107 such that a rotor identified generally as 101 in FIG. 1 may be directed towards an incoming wind direction 105. The rotation of the machine nacelle 103 about the vertical tower axis 107 is indicated by a yaw angle 106.

At the machine nacelle 103, the rotor 101 of the wind turbine 103 is rotatably mounted having its axis 1005 in a horizontal direction. The rotor 101 preferably includes at least one rotor blade 1010, 1011, 1012 and a hub 104. Each rotor blade 1010, 1011, 1012 may be adjusted with respect to a velocity of the incoming wind 105 by changing a pitch angle 108 of the individual rotor blade 1012. A change of the pitch angle 108 corresponds to a rotation of an individual rotor blade 101 about its longitudinal axis 113.

The hub 104 is connected to a main shaft 112 such that a rotational mechanical energy is obtained by the conversion of the wind energy 105 by means of the rotor blades 1010, 1011, 1012, and thereafter such rotational mechanical energy may be converted into an electrical energy by means of an electrical generator 111.

Figure 2:
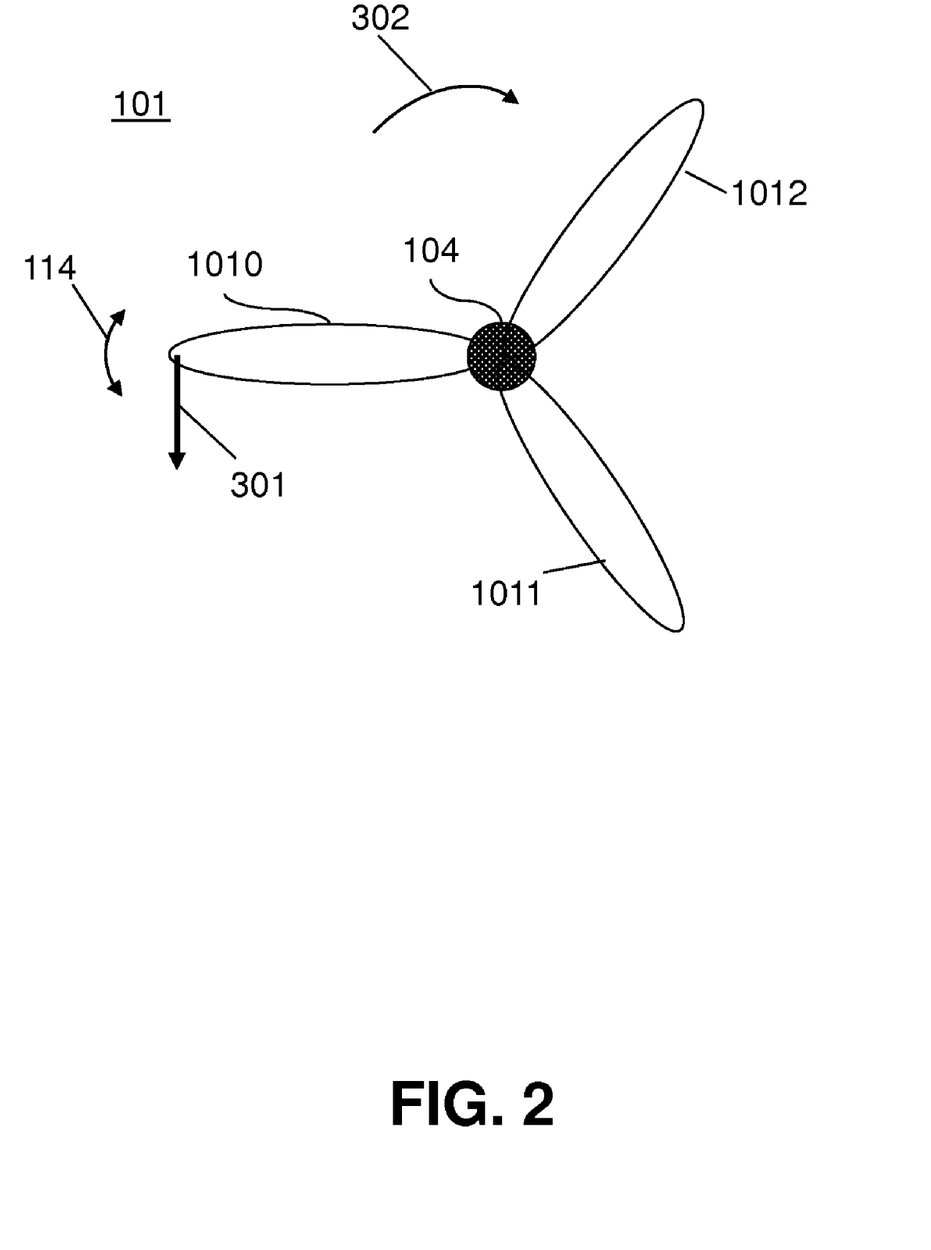
FIG. 2 is a partial front view of a rotor of a wind turbine including a hub and three individual rotor blades.

FIG. 2 is a partial front view of the rotor 101 of the wind turbine 100 shown in FIG. 1. The rotor 101 of the wind turbine 100 is seen from the front (i.e., from a direction indicated by an arrow 105 in FIG. 1). As shown in FIG. 2, the hub 104 carries three rotor blades 1010, 1011, 1012 according to a typical embodiment.

It is noted here that the rotor may include at least one rotor blade 1010 or a plurality of rotor blades 1010, 1011, 1012. While three rotor blades are described throughout the drawings in one typical embodiment, which may be combined with other embodiments, the number of rotor blades is not restricted to three. It is assumed, though not limited to the indicated direction, that a rotational direction of the rotor blade when viewed from the front is a clockwise direction as indicated by a reference numeral 302.

Thus, it will be appreciated that each individual rotor blade 1010, 1011, 1012 passes through predefined rotational positions during its clockwise rotation. As will be indicated in the description which follows, the main rotational positions during a clockwise rotation 302 of an individual rotor blade are defined as follows:

a 12 o'clock position which indicates that the specific rotor blade is in a vertical position with its tip pointing upward;

a 3 o'clock position or a position after a 90° rotation of the specific rotor blade in the rotation direction 302 (i.e., a position where the specific rotor blade is oriented horizontally with its tip pointing to the right in FIG. 2);

a 6 o'clock position where the specific rotor blade points downwards in a vertical direction with its tip pointing downwards to the ground (i.e., this position is opposite to the 12 o'clock position by 180°); and, a 9 o'clock position where the specific rotor blade is oriented horizontally with its tip pointing to the left (i.e., a position rotated from the 12 o'clock position by 270°, like blade 1010 in FIG. 2).

If the specific rotor blade is rotated from the 9 o'clock position again by 90° in the rotational direction, the original 12 o'clock position is reached again (see (i) above).

It is noted here that gravitational forces, as indicated by reference numeral 301, act on individual rotor blades along the entire length and width of the individual rotor blade. The gravitational forces 301 which act on the individual rotor blades will be described herein with reference to FIGS. 3-6.

The gravitational forces 301 may result in at least one gravity-induced blade moment which may be detected by specific moment sensors. The detected gravity induced blade moment may be used as an indicator for a rotational position of the rotor blade. An actual rotational position of the rotor blade may then be determined as a function of the measured gravity induced blade moment.

The gravity induced blade moment may be a pitch moment of the rotor blade (described herein below with respect to FIGS. 3 and 4, reference numeral 301) which may be detected by measuring respective motor currents of a pitch angle adjustment unit (see below). Furthermore, the gravity induced blade moment may be detected as a bending moment 114 of the rotor blade 1010. Such kind of bending moment 114 of rotor blade 1010 may be determined using stress sensors such as a strain gauge probe. The gravity induced bending results in a moment which is directed about an axis parallel to a rotor axis.

It is noted here that, in order to be able to predominantly detect gravity induced blade moments, other moments induced by environmental conditions of the wind turbine (e.g., wind loads) are negligible with respect to the gravity induced blade moments (i.e., the pitch moments and the bending moments of a rotor blade, respectively). Thus, measurements in accordance with one or more typical embodiments are based on an "idle" mode of the wind turbine, or when the rotor is idling.

In order to carry out the measurements according to typical embodiments, it is assumed that the rotor 101 having the three individual rotor blades 1010, 1011, 1012 idles (i.e., it is assumed that there is no incoming wind 105 or the velocity of the incoming wind only results in negligible forces or negligible external pitch moments or negligible external bending moments, respectively).

Figure 3:
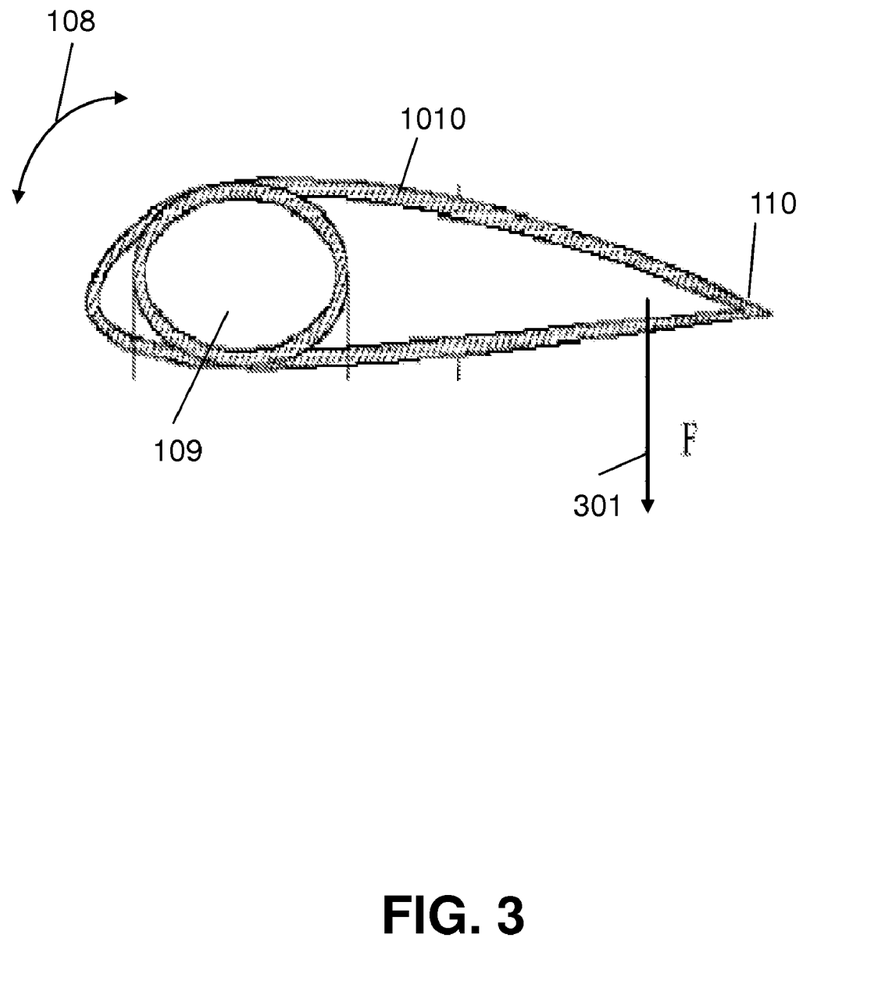
FIG. 3 is a cross-section of an individual rotor blade at a first rotational position of the rotor blade according to a typical embodiment.

FIG. 3 is a cross-section through an individual rotor blade 1010 at a longitudinal position of the individual rotor blade 1010 and near a rotor blade bearing 109. The rotor blade bearing 109 is the connection of the individual rotor blade 1010 to the hub 104 (see FIGS. 1 and 2).

As indicated in FIG. 1, the pitch angle 108 is adjusted by rotating the rotor blade 1010 about its longitudinal axis by a specific amount that is predetermined or given by a velocity of the incoming wind 105. Each rotor blade 1010 has an individual rotor blade bearing 109.

A pitch angle adjustment unit, which will be described with respect to FIG. 9 herein below, is provided in order to change the pitch angle 108 of the rotor blade 1010. It is noted here that a central axis of the rotor blade bearing 109 does not coincide with a center of gravity of the cross-section of the rotor blade 1010 shown in FIG. 3.

Thus, a varying gravitational force 301 acts on the rotor blade 1010 on the basis of its rotational position and the current pitch angle 108. For explanation purposes, it is assumed that the rotor blade position shown in FIG. 3 corresponds to a 3 o'clock position described herein above with reference to FIG. 2 (see (i)).

If the rotor idles and the pitch angle 108 is maintained at a predetermined value, it can be seen that different gravity induced blade moments act on an individual rotor blade 1010 while it is forming a full rotation together with the rotor 101 of the wind turbine 100. In order to determine a rotational position of an individual rotor blade 1010, the rotor blade 1010 is set to a predetermined pitch angle 108.

The rotor is then rotated while the predetermined pitch angle 108 of the rotor blade 1010 is maintained. The gravity induced blade moment 108 of the rotor blade 1010 is measured at least two different positions which will be described herein below with respect to FIGS. 4-7.

Since the rotor blade 1010 is not located at the center of gravity, a force F, 301 acts downwardly onto the rotor blade at the trailing edge 110.

FIG. 3 is a cross-section of a rotor blade 1010 viewed from the tip of the rotor blade in a direction towards the rotor blade bearing 109 and the hub 104, respectively. As indicated before, the rotor blade position shown in FIG. 3 corresponds to a 3 o'clock position with reference to FIG. 2 described above (number (i)).

Figure 4:
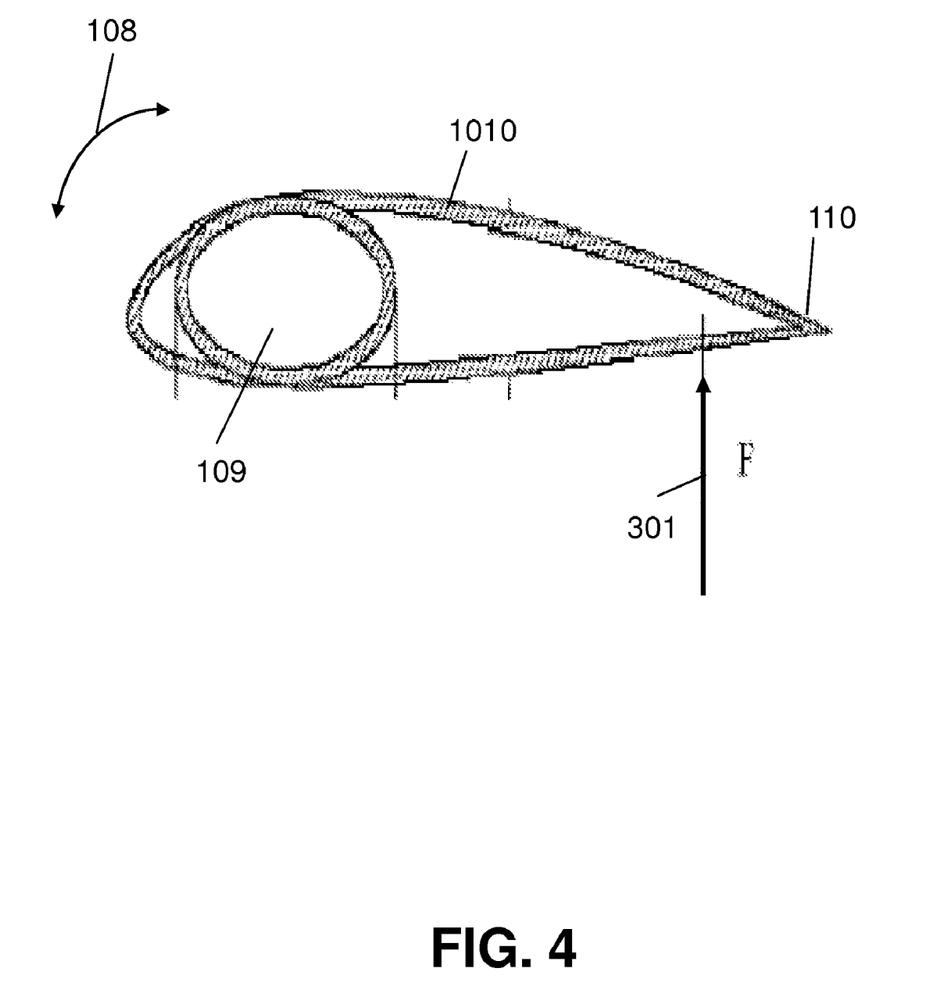
FIG. 4 is a cross-section of an individual rotor blade at a second rotational position of the rotor blade according to another typical embodiment.

FIG. 4 is another cross-section of a rotor blade 1010, viewed from the tip of the rotor blade. In the situation shown in FIG. 4, the rotor blade is in a 9 o'clock position such that a gravitational force F, 301 acts in the opposite direction as compared with the situation illustrated in FIG. 3.

Again, the value of the gravitational force acting on the turbine blade 1010 and the moment acting about the axis of the rotor blade bearing 109, respectively, depends on a yaw angle which has been adjusted and maintained while the rotor blade is rotating from the 3 o'clock position to the 9 o'clock position.

Thus, by comparing the direction of the gravitational force F, 301 in the situations shown in FIG. 4 and FIG. 3, a rotational position (i.e., 3 o'clock or 9 o'clock) can be determined.

It is noted here that the detected gravity induced blade moment acting on the rotor blade bearing 109 is a sum of all forces along the width of the rotor blade 1010, which is multiplied by their respective distances to the central axis of the rotor blade bearing 109. The gravity induced blade moment of the rotor blade 1010 may be measured during one rotation of the rotor or during a plurality of rotations of the rotor.

When the gravity induced blade moment is measured while rotating the rotor and maintaining the rotor blade 1010 at a predetermined pitch angle 108, a specific gravity induced blade moment curve is detected, as will be shown with respect to FIG. 7 herein below. The gravity induced blade moment may be determined on the basis of a pitch current of a pitch angle adjustment unit for a respective rotor blade 1010. This occurs when the pitch angle adjustment unit maintains the rotor blade 1010 at a predetermined pitch angle 108 while the rotor is idling. This pitch current may be determined from an energy consumption of the pitch angle adjustment unit or by means of a separate current sensor installed at the pitch angle adjustment unit.

Thus, the gravity induced blade moments of a plurality of rotor blades 1010, 1011, 1012 may be measured while the rotor is rotating. Besides the measurement of a current or power required by a pitch angle adjustment unit while maintaining a specific gravity induced blade moment while the rotor is idling, the gravity induced blade moment of an individual rotor blade may be measured by means of at least one stress sensor which is mounted at or near the rotor blade bearing 109. The stress sensor is capable of measuring stresses caused by the bending gravity induced blade moments. According to typical embodiments, the stress sensor may include at least one of a strain gauge, a fibre optic sensor, a resistor probe, an inductive detection unit and a magnetic detection unit.

If the power consumed by the pitch angle adjustment unit while maintaining the pitch angle at a predetermined value is used as an indicator for the pitch moment, no additional stress sensor has to be applied.

Figure 5:
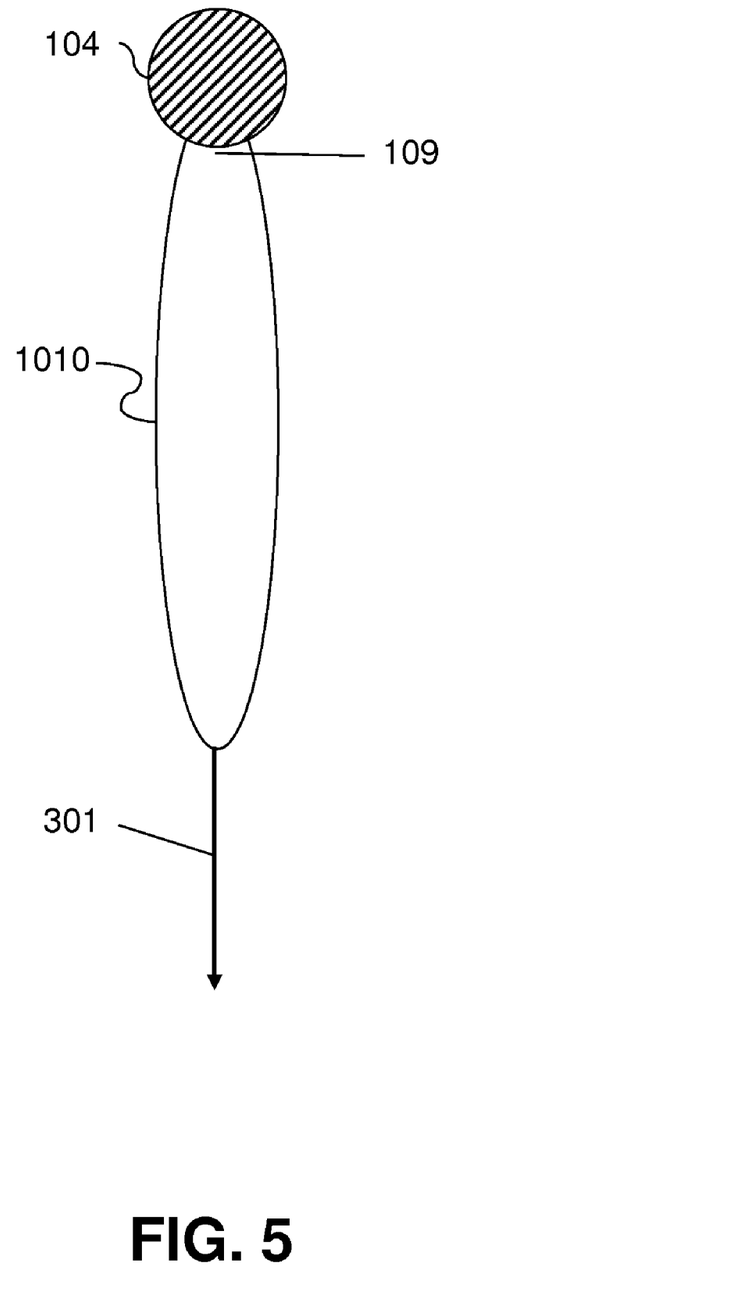
FIG. 5 is a front view of a rotor, wherein a hub and one single individual rotor blade is shown at a third rotational position of the rotor blade according to yet another typical embodiment.
Figure 6:
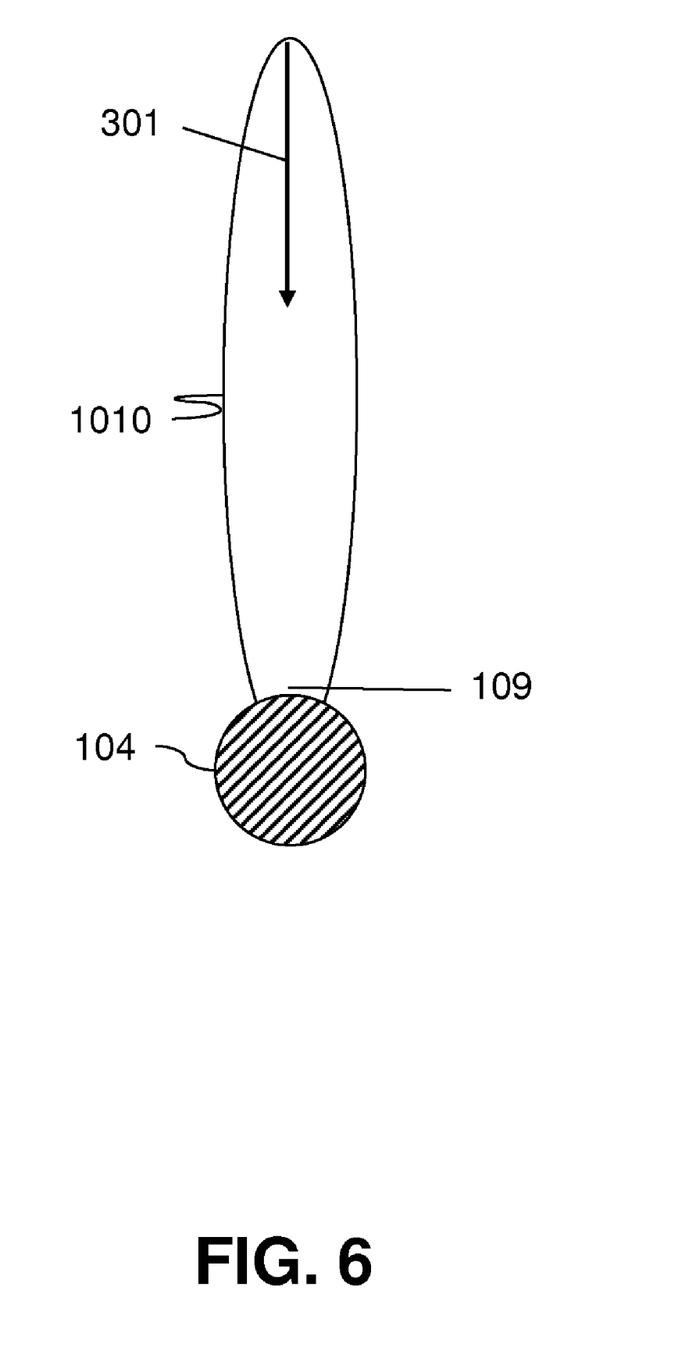
FIG. 6 is a front view of a rotor having a hub and one individual rotor blade shown at a fourth rotational position of the rotor blade according to yet another typical embodiment.

FIGS. 5 and 6 exhibit situations where the rotor is seen from the direction indicated by a reference numeral 105 (FIG. 1) as shown in FIG. 2, wherein two situations are shown which do not generate pitch moments on the basis of the gravitational force 301 when the rotor is idling.

FIG. 5 shows the hub 104 of a wind turbine 100 and one rotor blade 1010 which is mounted at the hub 104 via a rotor blade bearing 109. FIG. 5 shows a rotational position (iii) described above (i.e., the rotor blade 1010 of the rotor is in a 6 o'clock position). A gravitational force 301 acts in a direction shown by an arrow pointing downwards. In the situation shown in FIG. 5, it is not possible that the gravitational force 301 results in an externally applied pitch moment.

If the rotor blade 1010 is in the 12 o'clock position, as shown in FIG. 6, the gravitational force 301 is also not able to apply a pitch moment at the rotor blade bearing 109. Thus, for each individual rotor blade, the detected pitch moment is changing while the rotor 101 is rotating. If the rotor is rotating in the rotational direction 302 as indicated in FIG. 2, the gravity induced blade moment increases until the 3 o'clock position is reached (FIG. 3) and then decreases to zero at the 6 o'clock position (FIG. 5).

A further rotation of the rotor blade 302 in the rotational direction 302 inverses the gravity induced blade moment towards negative values the maximum of which is reached at the 9 o'clock position (FIG. 3).

Figure 7:
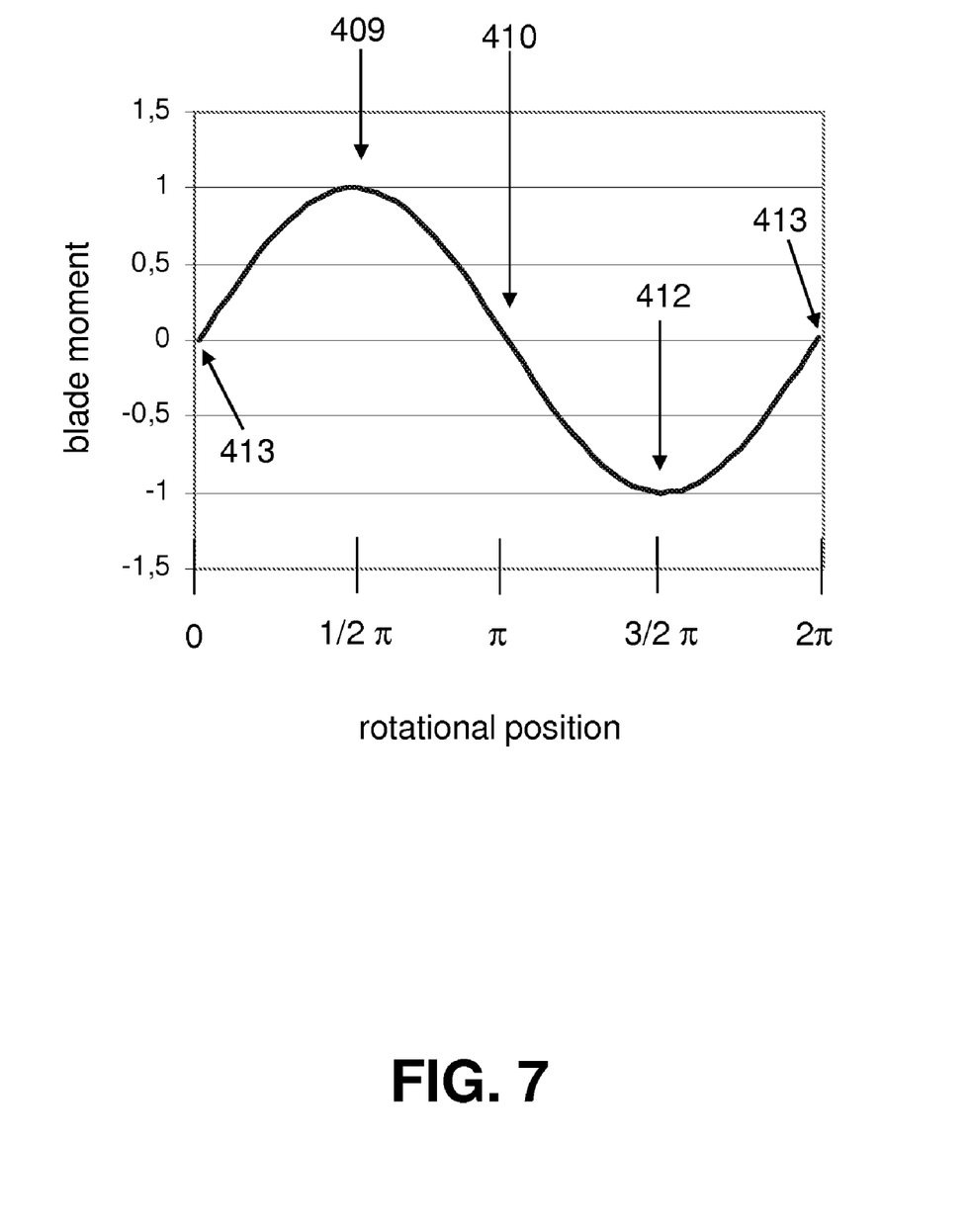
FIG. 7 is a graph illustrating a gravity induced blade moment curve for a single rotor blade during one rotation of the rotor

FIG. 7 is a graph illustrating a detected gravity induced blade moment on the basis of a rotational position of an individual rotor blade 1010. While the wind turbine 100 may comprise a plurality of rotor blades 101, 1011, 1012, only one rotor blade is considered with respect to FIG. 7 in order to ease the explanation. As shown in FIG. 7, the detected gravity induced blade moment exhibits a sinusoidal behaviour. At a 12 o'clock position 413, the rotor blade 1010 assumes a rotational position of 3° (i.e., the position indicated in FIG. 6).

As described earlier, the 12 o'clock position in accordance with FIG. 6 is not able to generate a gravity induced blade moment and it is therefore zero. When the rotor is idling in a direction as indicated by reference numeral 302 in FIG. 2, the gravity induced blade moment increases to a maximum relative value "1" at a 3 o'clock position 409 (which is also indicated in FIG. 3 and has been described herein above). A further rotation of the rotor blade in the rotational direction 302 results in a decrease of the gravity induced blade moment until the 6 o'clock position 410 is reached, at which no gravity induced blade moment is present. This is the situation shown in FIG. 5 described herein above.

Then, as long as the rotor is idling, the rotor blade transverses rotational positions where the gravitational force 301 results in a negative gravity induced blade moment. The negative gravity induced blade moment reaches its maximum value "−1" at the 9 o'clock position 412, which is also indicated in FIG. 4 described herein above.

It is noted here that the x-axis in the diagram shown in FIG. 7 (i.e., the rotational position) is given for one rotation of the rotor. A plurality of rotations of the rotor would accordingly result in a sinusoidal wave train wherein the gravity induced blade moment pattern shown in FIG. 7 is repeated.

Figure 8:
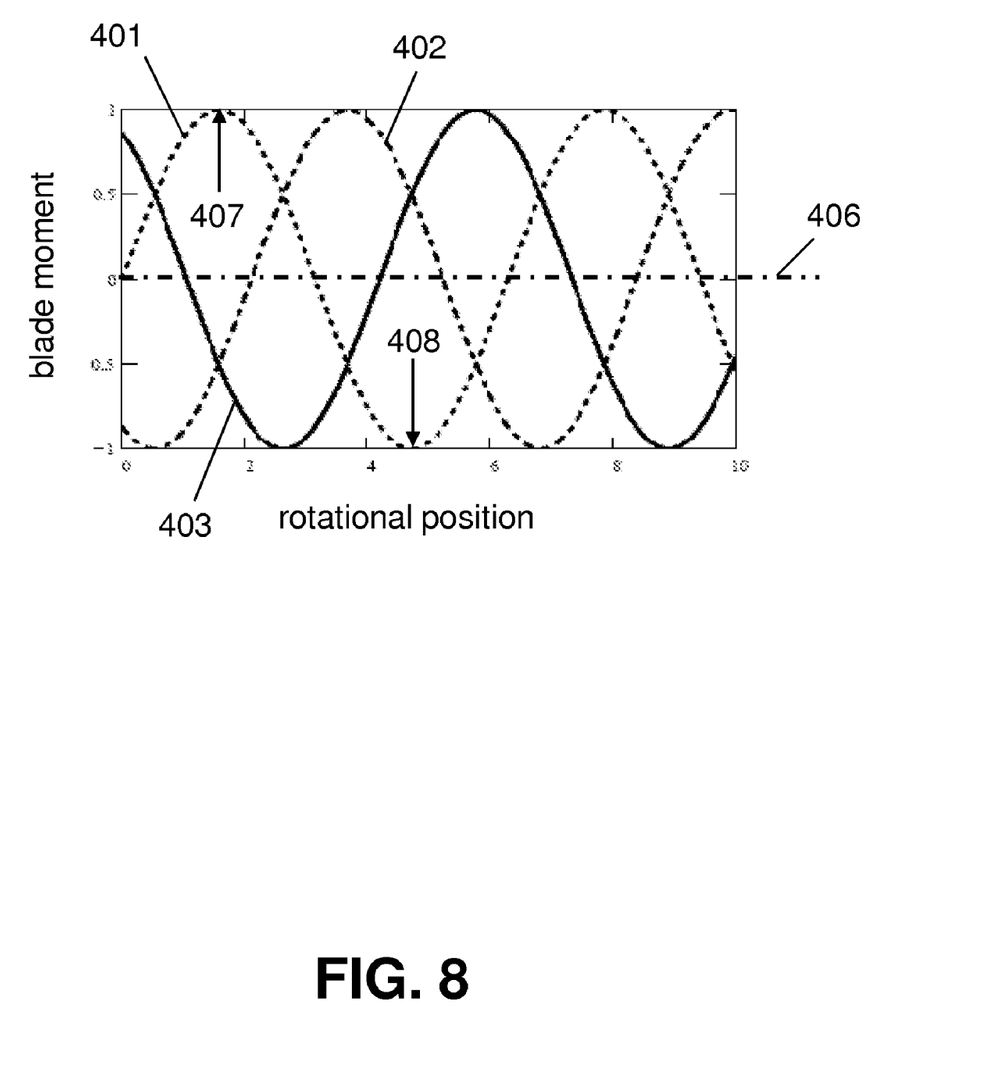
FIG. 8 is a graph illustrating gravity induced blade moments detected for three individual rotor blades which are mounted at the hub of the wind turbine.

FIG. 8 is another graph indicating a detected gravity induced blade moment on the basis of a rotational position, wherein the gravity induced blade moment curves of three individual rotor blades are indicated (i.e., a first gravity induced blade moment curve 401 detected at a first rotor blade 1010, a second gravity induced blade moment curve 402 detected at a second rotor blade 1011 and a third gravity induced blade moment curve 403 detected at a third rotor blade 1012).

A reference numeral 406 indicates a zero gravity induced blade moment line (i.e., 12 o'clock or 6 o'clock positions of the specific rotor blade 101). If the rotor includes three individual rotor blades 101, the gravity induced blade moment curves 401, 402 and 403 are offset by a phase angle of 120°.

It is noted here that the x-axis of the diagram shown in FIG. 8 indicates radian values from a value of 0 to a value of 10. Thus, it is possible to measure individual gravity induced blade moment curves 401, 402 and 403 and correlate the curves with individual rotor blades 1010, 1011, 1012.

The rotational position measurement device in accordance with a typical embodiment thus is capable of detecting a rotational position of each rotor blade 1010, 1011, 1012. Moreover, it is possible to obtain information about an order of the rotor blades installed at a hub 104 of a wind turbine 100 by comparing phases of the individual gravity induced blade moment curves 401, 402, 403.

The gravity induced blade moment 401 of the rotor blade 1010 may be measured during one or more rotations of the rotor 101 of the wind turbine 100. Furthermore, the gravity induced blade moment 401 of the rotor blade 1010 may be compared to a predetermined gravity induced blade moment curve which has been measured and stored in a memory unit. Thus, the predetermined gravity induced blade moment curve and the actually measured gravity induced blade moment 401 may be compared to each other and a rotor blade position is detectable from the detected gravity induced blade moment described herein above with respect to FIGS. 3 to 7.

It is noted here that the gravity induced blade moment curves indicated in FIGS. 7 and 8 are gravity induced blade moment curves which are detected while the rotor is idling (i.e., a wind load at the rotor blades 1010, 1011, 1012 is not present).

The method for determining a rotational position of at least one rotor blade 1010 according to a typical embodiment is thus based on a rotor blade center of gravity model. When the rotor idles with the individual blades 1010, 1011, 1012 positioned at a pitch angle of more than 45°, gravity induced blade moment curves 401, 402, 403 as the ones shown in FIGS. 7 and 8 are obtained. A pitch drive system, such as a pitch angle adjustment unit, is active to maintain the pitch angle 108 fixed at a desired value.

This means in cases of an electrical pitch drive system that the mechanical rotor brake is not engaged and that the pitch drive system has to apply torque and/or current to the pitch motor in order to force the rotor blade 1010 into the desired position. If the rotor blade 1010 is positioned horizontally at a 3 o'clock position, the trailing edge 110 will be pulled down.

Maximum positive torque needs to be applied to the pitch drive system in order to maintain this position, i.e., in order to maintain the desired pitch angle. If the rotor blade is positioned at the 9 o'clock position, a maximum negative torque needs to be applied. Rotor blade positions at or near the 12 o'clock position and the 6 o'clock position are equivalent to a gravity induced blade moment or torque zero crossing.

A rotor blade order can then be determined from the phase differences between gravity induced blade moments of individual rotor blades.

Figure 9:
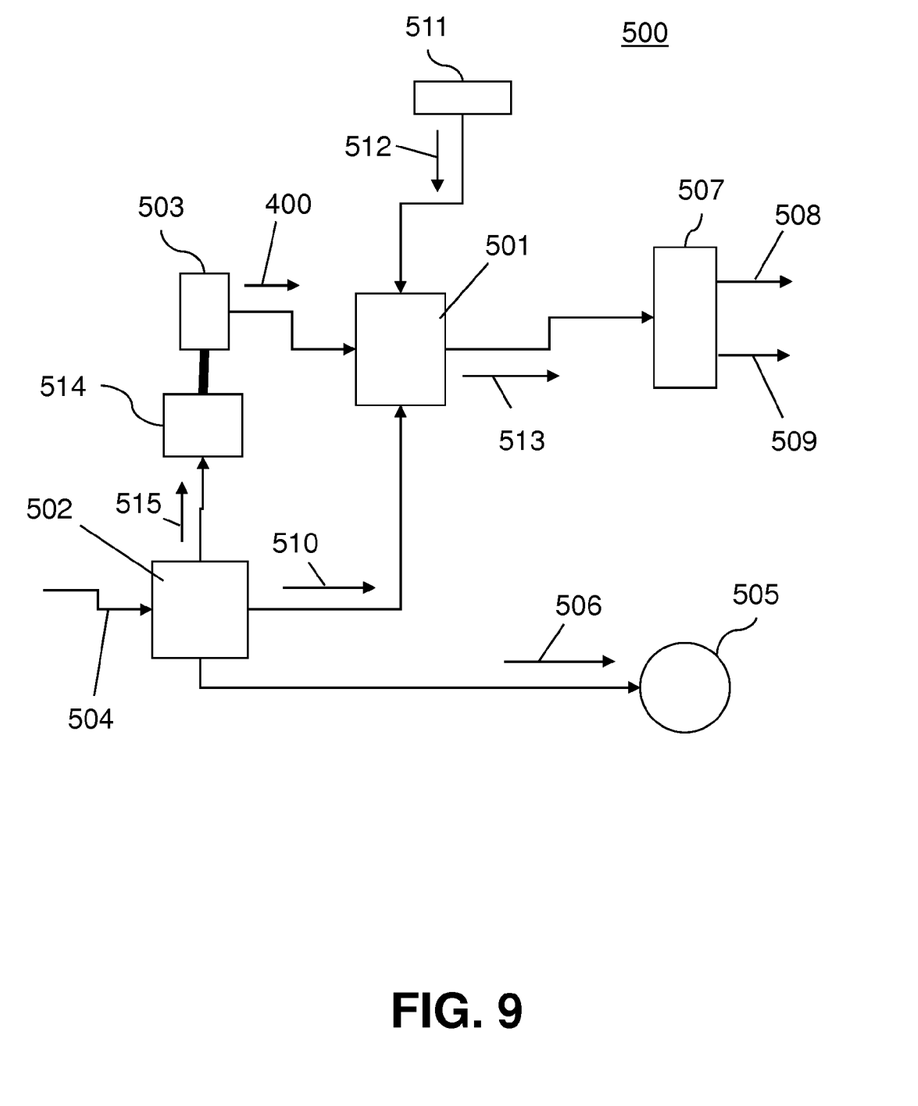
FIG. 9 is a block diagram of a measurement device adapted for measuring a rotational position of at least one rotor blade of the wind turbine according to a typical embodiment; and, FIG. 10 is a flowchart illustrating a method for determining a rotational position of at least one rotor blade of the wind turbine.

FIG. 9 is a block diagram of a rotational position measurement device 500 adapted for measuring a rotational position of at least one rotor blade 1010 of a wind turbine 100. A control unit 502 is provided as a central device for controlling a determination unit 501, a pitch angle adjustment unit 514 and a rotor drive system 505.

The control unit 502 receives a control signal 504, e.g. from a wind turbine master controller, and outputs a pitch angle set signal 515 which is used for setting the pitch angle 108 to a desired value which is maintained during the rotation of the rotor blade 1010. Furthermore, a rotor drive signal 506 is provided by the control unit 502 in order to control the rotor drive system 505 such that the rotor performs at least one complete rotation.

As indicated in FIG. 9, a gravity induced blade moment detector 503 is provided which is connected to the pitch angle adjustment unit 514 such that a current which is necessary to maintain a desired pitch angle 108 may be used as an actual gravity induced blade moment. The actual gravity induced blade moment is provided for the determination unit 501, which receives a reference signal 510 from the control unit 502. This reference signal 510 may be the rotational speed of the rotor.

Furthermore, the determination unit 501 may be provided with a predetermined pitch curve 512, which has been stored previous to the measurement of the gravity induced blade moment in a memory unit 511. The determination unit 501 outputs a determination signal 513, which is then provided to an output unit 507.

Moreover, the determination unit 501 may include a blade order determination means adapted for determining an order of the individual rotor blades 1010, 1011, 1012 by detecting phase differences between the respective gravity induced blade moment curves as shown in FIG. 8.

The output unit 507 provides a rotor blade position signal 508 for determining a rotational position of an individual rotor blade 101 and a rotor blade order signal 509 for providing a rotor blade order as far as three or more rotor blades are attached to the rotor of the wind turbine 100.

It is noted here, while not shown in FIG. 9, that the gravity induced blade moment detector 503 and the pitch angle adjustment unit 514 may be provided as a combined unit. Furthermore, the gravity induced blade moment detector 503 may be provided as a separate sensor unit such as, but not limited to, a strain gauge, a fiber optic sensor, a resistor probe, an inductive detection unit and a magnetic detection unit.

Figure 10:
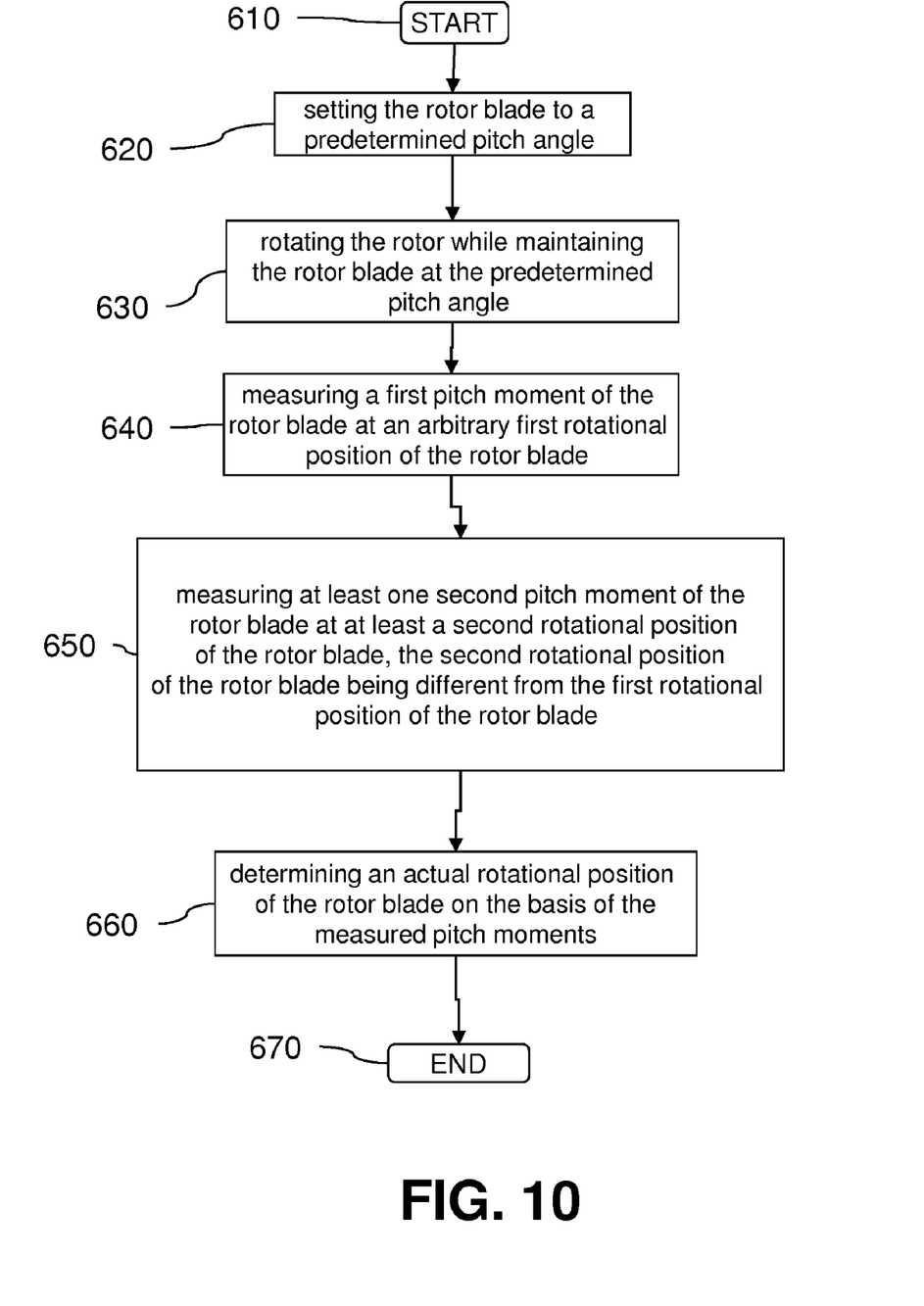

FIG. 10 is a flowchart illustrating a method for determining a rotational position of at least one rotor blade of a wind turbine. At a step 610, the procedure is started. Then, at a step 620, an individual rotor blade 1010 is set to a predetermined pitch angle 108.

The procedure advances to a step 630, where the rotor 101 of the wind turbine 100 is rotated while the specific rotor blade 1010 is maintained at the predetermined pitch angle 108 set at the step 620 above.

At a step 640, the first gravity induced blade moment of the rotor blade 1010 is measured at an arbitrary first rotational position of the rotor blade 108.

Then, the procedure advances to a step 650 where at least one second gravity induced blade moment 108 of the specific rotor blade 1010 is measured at least a second rotational position of the rotor blade 1010. The second rotational position of the rotor blade 1010 is different from the first rotational position of the rotor blade 1010 because the rotor 101 has rotated away from the first rotational position.

Then, at a step 660, an actual rotational position of the rotor blade 1010 is determined on the basis of the measured first and at least one second gravity induced blade moment 108. At a step 670, the procedure is ended.

This written description uses examples to disclose the invention, including the best mode, and also to enable any person skilled in the art to practice the described subject-matter, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for determining a rotational position of at least one rotor blade of a wind turbine, the method comprising:
    measuring a gravity induced blade moment of the at least one rotor blade;
    determining an actual rotational position of the at least one rotor blade from the measured gravity induced blade moment; and
    determining a blade order of individual rotor blades of the wind turbine on the basis of the measured gravity induced blade moment for each rotor blade.

2. The method in accordance with claim 1, wherein the gravity induced blade moment comprises a pitch moment of said rotor blade.

3. The method in accordance with claim 2, further comprising:
    setting the at least one rotor blade to a predetermined pitch angle;
    rotating the rotor while maintaining the at least one rotor blade at the predetermined pitch angle;
    measuring the pitch moment of the at least one rotor blade at a rotational position of the at least one rotor blade; and
    determining the actual rotational position of the at least one rotor blade from the measured pitch moment.

4. The method in accordance with claim 1, wherein the gravity induced blade moment of the at least one rotor blade is measured over a full rotation of the rotor.

5. The method in accordance with claim 1, wherein the gravity induced blade moment of the at least one rotor blade is compared to a predetermined gravity induced blade moment curve to determine the actual rotational position of the at least one rotor blade.

6. The method according to claim 1, wherein measuring a gravity induced blade moment and determining an actual rotational position therefrom is performed for more than one rotor blade of said wind turbine.

7. The method according to claim 6, wherein measuring a gravity induced blade moment and determining an actual rotational position therefrom is performed for each rotor blade of said wind turbine.

8. The method in accordance with claim 2, wherein the pitch moment is determined on the basis of a pitch current of a pitch angle adjustment unit of the at least one rotor blade, the pitch current being used to maintain the rotor blade at a predetermined pitch angle.

9. A measurement device configured to measure a rotational position of at least one rotor blade of a wind turbine, the measurement device comprising:
    a moment detector configured to measure a gravity induced blade moment of the at least one rotor blade; and
    a determination unit configured to determine an actual rotational position of the at least one rotor blade and a blade order of rotor blades from the measured gravity induced blade moment.

10. The measurement device in accordance with claim 9, wherein the gravity induced blade moment comprises a pitch moment, and wherein the moment detector comprises a pitch moment detector configured to measure the pitch moment of the at least one rotor blade at an arbitrary rotational position of the at least one rotor blade.

11. The measurement device in accordance with claim 9, wherein the gravity induced blade moment further comprises a bending moment of the at least one rotor blade and wherein the moment detector comprises a bending moment detector configured to measure at least one bending moment of the at least one rotor blade at an arbitrary rotational position of the at least one rotor blade.

12. The measurement device in accordance with claim 11, wherein the bending moment detector comprises at least one of a strain gauge, a fiber optic sensor, a resistor probe, an inductive detection unit, and a magnetic detection unit.

13. The measurement device in accordance with claim 9, further comprising a memory unit configured to store a predetermined gravity induced blade moment curve.

14. The measurement device in accordance with claim 13, wherein the determination unit is configured to compare the measured gravity induced blade moment with the stored predetermined gravity induced blade moment curve.

15. The measurement device in accordance with claim 10, wherein the moment detector comprises a current sensor configured to measure a pitch current of a pitch angle adjustment unit of the at least one rotor blade when the at least one rotor blade is maintained at a predetermined pitch angle.

16. A wind turbine including a rotor comprising at least one rotor blade, a pitch angle adjustment unit configured to adjust a pitch angle of the at least one rotor blade and a rotational position measurement device, the rotational position measurement device comprising:
    a moment detector configured to measure a gravity induced blade moment of the at least one rotor blade; and
    a determination unit configured to determine an actual rotational position of the at least one rotor blade and a blade order of individual rotor blades of the wind turbine from the measured gravity induced blade moment.

17. The wind turbine in accordance with claim 16, wherein the gravity induced blade moment comprises a pitch moment, and wherein the moment detector comprises a pitch moment detector configured to measure the pitch moment of the at least one rotor blade at an arbitrary rotational position of the at least one rotor blade.

18. The wind turbine in accordance with claim 16, wherein the gravity induced blade moment further comprises a bending moment of the at least one rotor blade and wherein the moment detector comprises a bending moment detector configured to measure at least one bending moment of the at least one rotor blade at an arbitrary rotational position of the at least one rotor blade.

19. The method in accordance with claim 1, wherein the gravity induced blade moment further comprises a bending moment of the at least one rotor blade.

* * * * *

UNITED STATES PATENT AND TRADEMARK OFFICE
CERTIFICATE OF CORRECTION

| | | |
|---|---|---|
| PATENT NO. | : 8,177,505 B2 | Page 1 of 1 |
| APPLICATION NO. | : 12/765560 | |
| DATED | : May 15, 2012 | |
| INVENTOR(S) | : Hartmut Scholte-Wassink | |

It is certified that error appears in the above-identified patent and that said Letters Patent is hereby corrected as shown below:

In Column 4, Line 66, delete "at least" and insert -- at at least --, therefor.

In Column 8, Line 50, delete "at least" and insert -- at at least --, therefor.

In Column 9, Lines 23-24, in Claim 2,
delete "moment comprises a pitch moment of said rotor blade." and
insert -- moment further comprises a bending moment of the at least one rotor blade. --, therefor.

Signed and Sealed this
Twenty-first Day of August, 2012

David J. Kappos
*Director of the United States Patent and Trademark Office*